(12) United States Patent
Tsuchiya

(10) Patent No.: US 7,002,272 B2
(45) Date of Patent: Feb. 21, 2006

(54) BRUSHLESS MOTOR

(75) Inventor: Masahisa Tsuchiya, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 0 days.

(21) Appl. No.: 10/852,808

(22) Filed: May 25, 2004

(65) Prior Publication Data

US 2004/0239197 A1   Dec. 2, 2004

(30) Foreign Application Priority Data

May 29, 2003   (JP) .............................. 2003-152171

(51) Int. Cl.
*H02K 5/10* (2006.01)
(52) U.S. Cl. ...................... 310/85; 310/90; 310/156.26
(58) Field of Classification Search .................. 310/85, 310/90, 156.26
See application file for complete search history.

(56) References Cited

U.S. PATENT DOCUMENTS

| | | | |
|---|---|---|---|
| 4,174,484 A * | 11/1979 | Schmider ................. | 310/68 R |
| 5,821,646 A * | 10/1998 | Chuta et al. ............... | 310/67 R |
| 5,880,545 A * | 3/1999 | Takemura et al. ............ | 310/90 |
| 6,710,488 B1 * | 3/2004 | Kronenberg et al. .......... | 310/90 |
| 6,876,114 B1 * | 4/2005 | Knotts et al. .......... | 310/156.26 |

* cited by examiner

Primary Examiner—Joseph Waks
(74) Attorney, Agent, or Firm—Jordan and Hamburg LLP

(57) ABSTRACT

A lubricating oil scattering prevention arrangement provided near a bearing whereby the outward scattering of lubricating oil that leaked from between a stator and rotor due to tilting, impact or the like is prevented. A plate-shaped rotor case 30 is provided with a descending portion 31, a step portion 32 and an outer peripheral portion 33. A magnet 4 is provided on the inner side of the outer peripheral portion 33 and a lubricating oil absorption member is provided between the magnet 4 and the step portion 32. Because an outer peripheral portion of the lubricating oil absorption member is compressed by the magnet 4 upper surface portion and the step portion 32 and thus attached, the lubricating oil absorption member absorbs lubricating oil leaked from the bearing part and the compressed portion prevents the lubricating oil from leaking outwardly.

5 Claims, 3 Drawing Sheets

BRUSHLESS MOTOR

BACKGROUND OF THE INVENTION

1. Field of the Invention

The present invention relates to a brushless motor used in a spindle motor or fan motor in which a disk is driven by a disk drive. More specifically, it relates to a brushless motor provided with an oil-leak prevention means for preventing lubricating oil used in a bearing part thereof from leaking to the outside of the motor.

2. Background Art

A variety of configurations have been used heretofore for brushless motors used in disk drives and the like. FIG. 3 shows such a motor of a relatively low price. In the portion of FIG. 3 to the right of the central line, a cross-sectional view of elements are indicated by shading.

The legend 2 designates a rotor that rotates with a rotary shaft 1. This rotor 2 includes a cylindrical cap-shaped rotor case 3, a magnet 4 attached to the entire periphery of the rotor case 3, and an attraction magnet 5 that impels the rotor 2 in the downward direction in the figure.

A bearing holder 7 is fixed to a stator base 6 for example by caulking. A bearing 8 is inserted into the bearing holder 7 and rotatably supports the rotary shaft 1. The bearing holder 7 is closed at the end toward the bottom of the figure, and it supports the bottom end of the rotary shaft 1 via a thrust reception sheet 13.

On the outer periphery of the bearing holder 7, a stator core 9 around which a coil 10 is wound is fixed, and the terminal of the coil 10 is connected by soldering or the like to a connection pattern not shown in the figure of a flexible base 12 provided on the upper surface of the stator base 6.

The lower side of the bearing 8 (i.e., the stator base side), because it has a recessed portion 19 in the inside central portion thereof, has a small-diameter portion 18 with a smaller diameter than other portions. Because of the recessed portion 19, the rotary shaft 1 is rotatably supported by the portions near both end parts of the bearing 8.

Below the bearing 8 a slip-off prevention washer 11 works together with a groove 14 provided on the rotary shaft 1 to prevent the rotor 2 from slipping off.

An attraction plate 20 is fixed on the upper end part of the bearing holder 7 as seen in the figure. This attraction plate works with an attraction magnet 5 to generate attractive magnetic force, impelling the rotor 2 downward. The reason for this is to always impel the rotor in the downward direction (i.e., the thrust direction) and to prevent vibration in the rotor and drive shaft thrust direction when the rotor is used at fast revolutions. This attraction plate 20 also prevents lubricating oil that has penetrated into the bearing 8 from scattering.

Many patent applications disclose a rotor having a configuration such that a bearing is provided with lubricating oil scattering prevention means, for example, JP 11-89172A and JP 2003-32932A.

In the configuration disclosed in JP 11-89712A, a recess is provided in the upper part of a bearing for storing lubricating oil (which lowers the pressure of the oil passing through gap 24), and a scattering prevention means (sealing means 20 constituted between an extension part 23 and bearing 11) surrounding a bearing is further provided on a turntable.

In the configuration disclosed in JP 2003-32932A, slip-off prevention means is provided facing the upper end part of a bearing, and this is used as lubricating oil scattering prevention means (engaging part 14 of slip-off prevention member 7 and engaged part 12 of protrusion 20 and bearing 8).

Both of these configurations are provided for the purpose of preventing the leaking and scattering of lubricating oil from a bearing.

However, because a configuration is needed on both the stator side and rotor side in order to constitute these scattering prevention means, a gap is unavoidably provided between the configuration on the bearing side and the configuration on the rotor side.

In such cases, if these motors are attached to devices in which they are to be contained in an upright manner, and the devices are used in a still condition, then there is no problem, but if for example, the motor is attached to a portable device and is used in a state in which it is subject to change in posture and impact, there will be cases where lubricating oil leaks from the aforementioned gap.

Further, when the motor is driven, lubricating oil that has leaked out from the scattering prevention means is scattered outwardly by centrifugal force due to the rotation of the rotor, and is scattered through the rotor downwardly by and to the outside.

SUMMARY OF THE INVENTION

The present invention provides a brushless motor that solves this problem and with a simple configuration, prevents lubricating oil from being scattered to the outside.

The above object can be obtained by a brushless motor having an abduction-type rotor rotatably supported on a stator, wherein a ring-shaped lubricating oil absorption member for absorbing lubricating oil is attached to a rotor case formed from a plate material, and such lubricating oil absorption member is attached to the rotor with the outer periphery thereof compressed by the magnet and rotor case.

By disposing a lubricating oil absorption member with its outer periphery in a compressed state between the magnet and rotor case, lubricating oil that would otherwise scatter across the inside of the rotor case is absorbed, and by stopping the lubricating oil with such compressed portion, lubricating oil is prevented from scattering from the rotor.

As described above, lubricating oil can be prevented from scattering to the outside with just a simple configuration.

Further, because the configuration can be accomplished through a simple press processing, production of the motor is simple and inexpensive.

DESCRIPTION OF THE PREFERRED EMBODIMENTS

Figure 1:
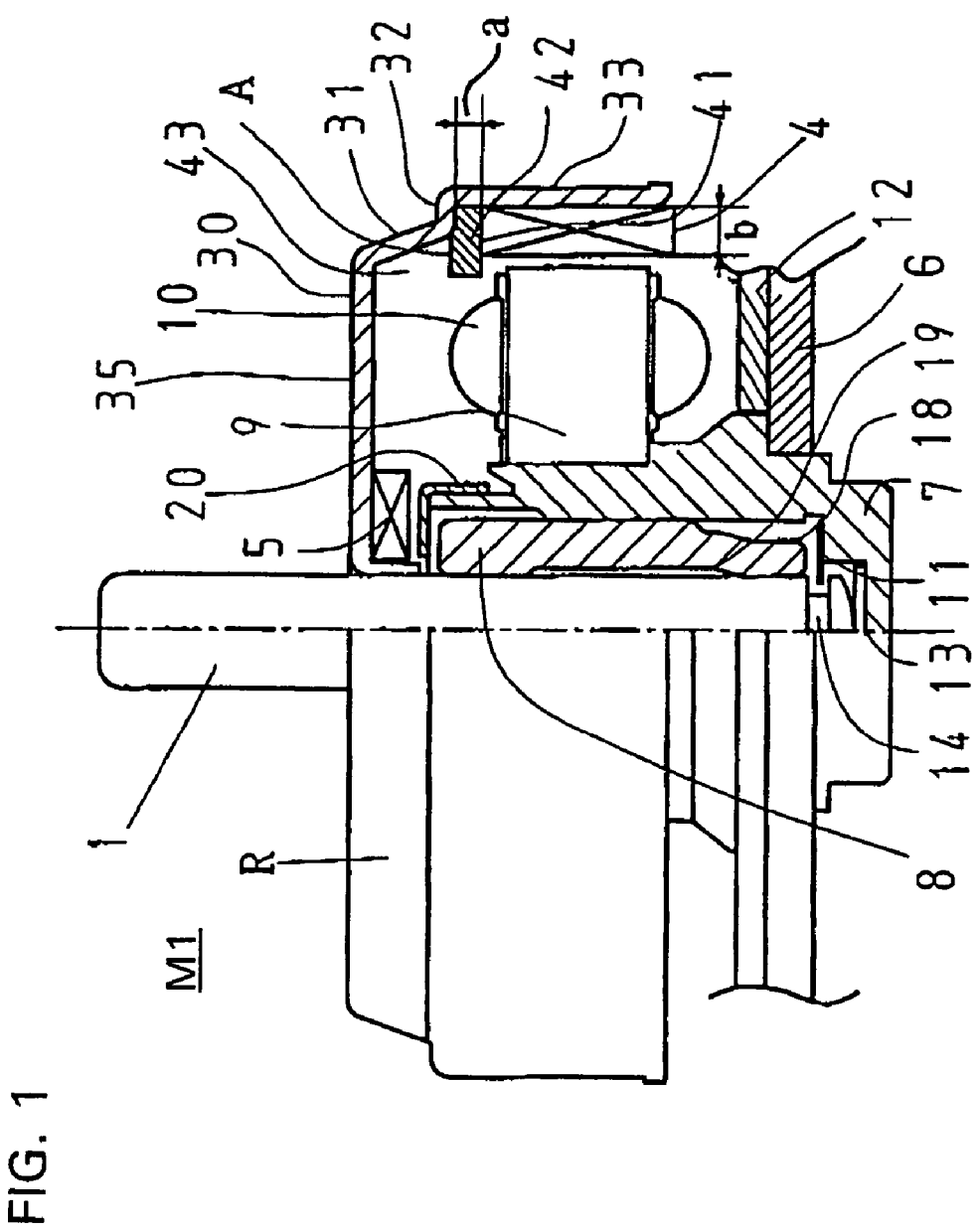
FIG. 1 shows a radial air-gap brushless motor according to a first embodiment of the present invention, the right-hand portion thereof showing a cross-section of essential elements.

Embodiments of the invention will be explained with reference to the drawings. Elements that are the same as those in the conventional motor and have the same operation and effect have been given the same number, and an explanation thereof has been omitted.

Unless otherwise specified, the configuration is formed in a circular shape centering on the rotary shaft 1.

The stator of this motor M1 comprises a stator base 6 to which a bearing holder 7 is fixed by caulking or the like, a stator core 9 fixed on the bearing holder 7, a coil 10 wrapped around the stator core 10, and a flexible base 12 provided on the upper surface of the stator base 6.

On the inside of the bearing holder 7, a thrust-receiving part 13, a slip-off prevention washer 11 and a bearing 8 are attached, and on the upper end thereof an attraction plate 20 is attached. A rotor case 30 is fixed to the rotary shaft 1.

The rotor case 30 is made of magnetic plate material, and is formed through press processing and drawing. In the center thereof a burring part 34 is formed, and the rotary shaft 1 is fixed therein through press insertion.

The rotor case 30 has a flat plate portion 35 formed around the burring part 34, and the outer periphery thereof is made to curve by press processing, so as to form three consecutive circular shapes, namely, descending portion 31, step portion 32 and outer peripheral portion 33.

The descending portion 31 is inclined so as to expand outward as it descends, and the step portion 32 extends even further outward than the descending portion 31, thus forming a step with the descending portion 31.

The outer periphery portion 33 is formed starting from the step portion 32, concentric with and parallel to the rotary shaft 1, to accommodate attachment of the magnet 4.

Because these elements are formed from a single sheet of material by press processing, they can be manufactured relatively inexpensively.

An attraction magnet 5 is attached to the burring part 34, and the magnet 4 is fixed using an adhesive to a position on the inner side of the outer periphery portion 33 facing the stator core 9. The adhesive in this case is applied to the outer peripheral surface of the magnet 4 and the inner surface of the outer peripheral portion 33.

So that a space is formed above the upper end surface 41 of the magnet 4 (i.e., the rotary shaft 1 side of the magnet 4), between the magnet 4 and the inner surface of the step portion 32, the magnet 4 is made shorter than the outer peripheral portion 33.

In the space 42 formed above the upper end surface 41 of the magnet 4, a lubricating oil absorption member A is attached using an adhesive. This lubricating oil absorption member A is wider laterally than the step portion 32 and is thicker than the magnet 4.

This lubricating oil absorption member A is formed from a compressible material, such as felt, foam rubber, or porous resin; absorbs liquids; and is formed in a ring shape. It is thicker than a gap a between the step portion 32 and the upper end surface 41 of the magnet 4. Also the radial dimension of the absorption member A is greater than the radial dimension b of the magnet 4.

The dimensions of the lubricating oil absorption member A are set so that because the lubricating oil absorption member A is compressed by being attached, lubricating oil absorption member A is securely fixed, and so that its inner spaces are compressed so that lubricating oil does not leak out therefrom. Further, except for the portion compressed by the step portion 32, the inner spaces of lubricating oil absorption member A remain as such, thus allowing for good absorption of the lubricating oil.

The lubricating oil absorption member A extends inward beyond the step portion 32, thus forming, together with the inner side of the descending portion 31, a space 43.

Lubricating oil that has leaked from the bearing is scattered outwardly due to the centrifugal force of the rotation of the rotor. Most of this oil passes through the inner side of the rotor case 30 (inner side of the flat surface 35). This then strikes the descending portion 31, because the descending portion 31 inclines outwards as it descends, the lubricating oil, due to the centrifugal forces, continuing further and reaches the space 43.

Lubricating oil reaching the space 43 is absorbed by the lubricating oil absorption member A. In addition, as described above, because the lubricating oil absorption member A is compressed by the magnet 4 and step portion 32, there is no leakage of lubricating oil downward or outward therefrom.

Figure 2:
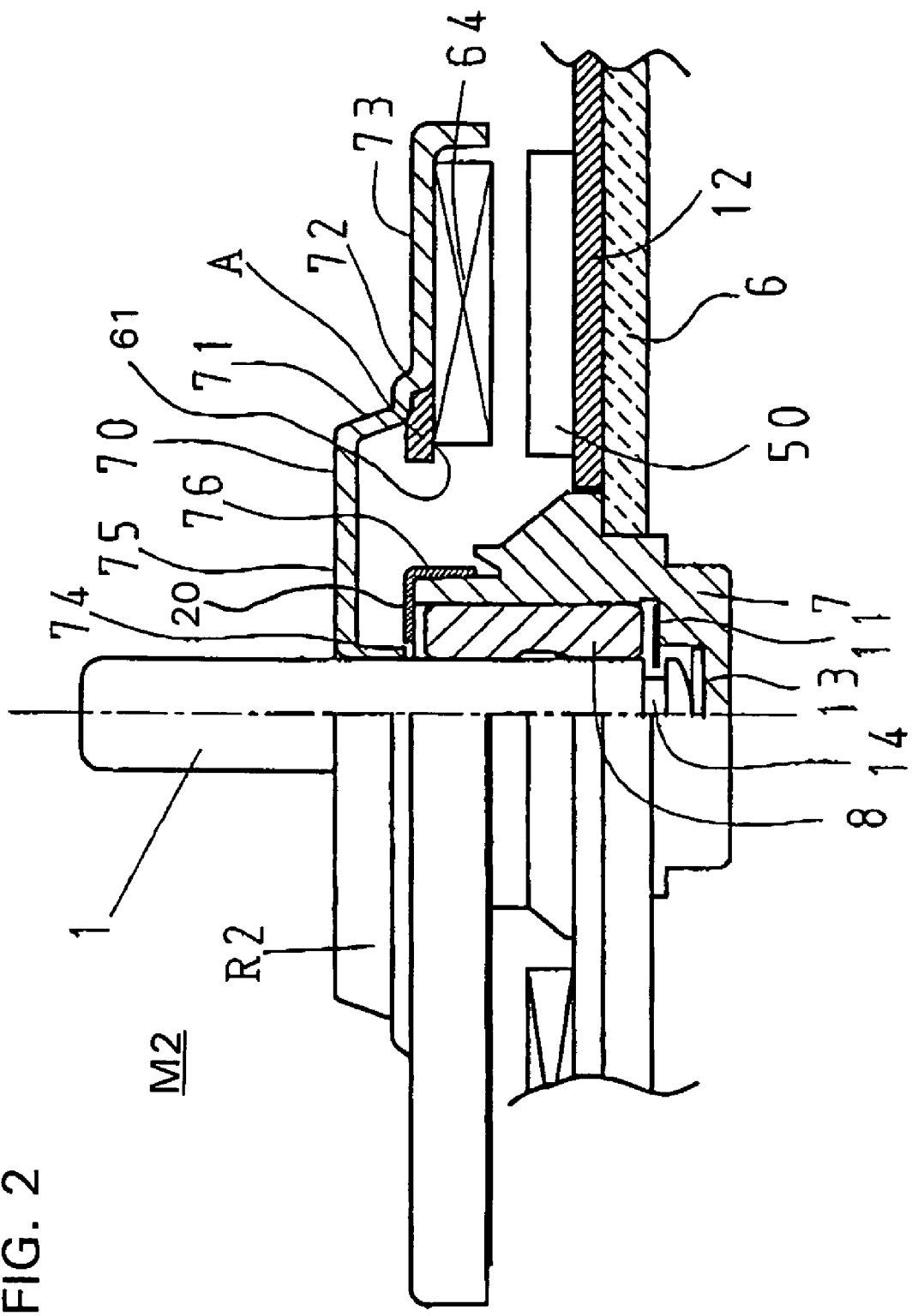
FIG. 2 shows an axial air-gap brushless motor according to a second embodiment of the present invention, the right-hand portion thereof showing a cross-section of essential elements.
Figure 3:
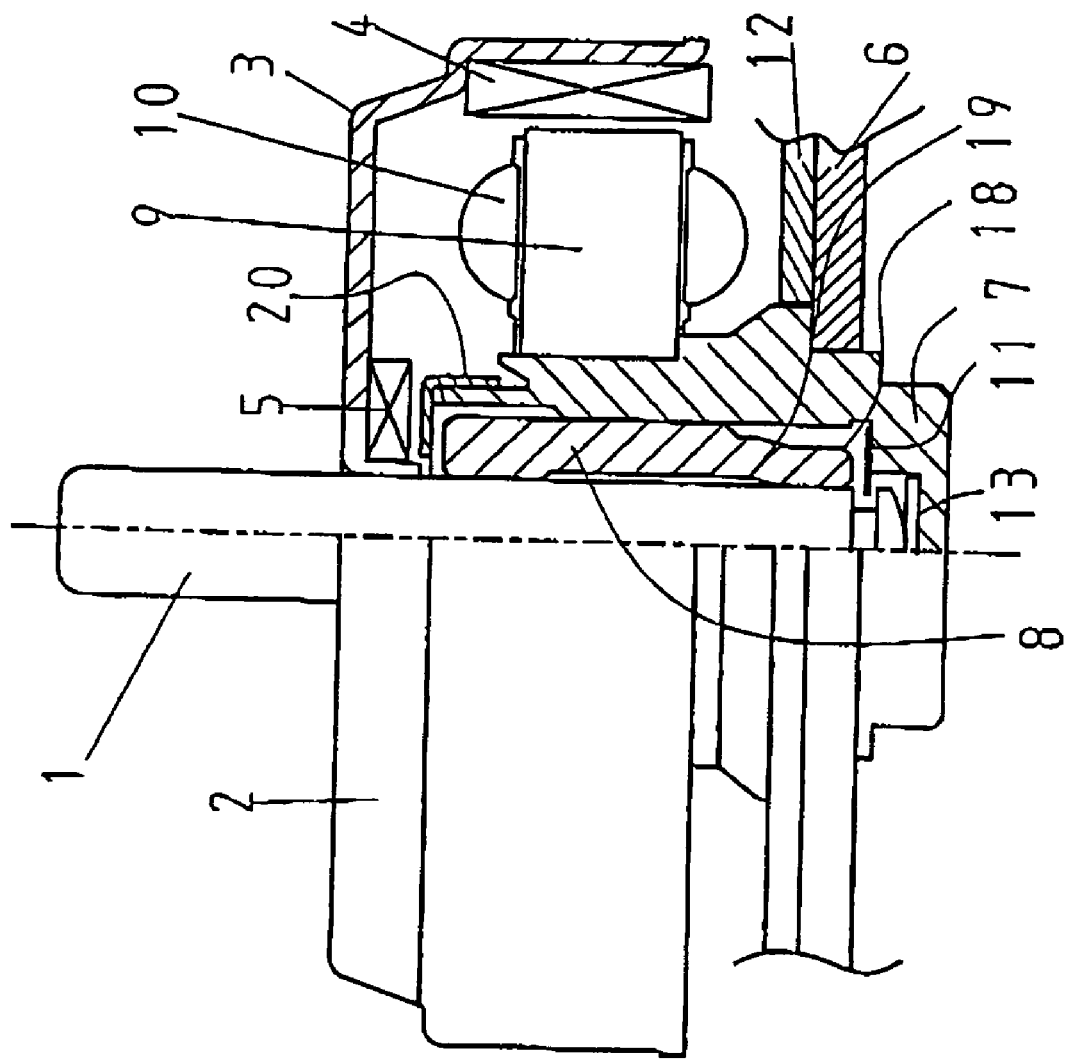
FIG. 3 shows a conventional brushless motor, the right-hand portion thereof showing a cross-section of essential elements.

FIG. 1 showed an embodiment in the form of a radial air-gap brushless motor FIG. 2 shows an embodiment of the present invention used in an axial air-gap brushless motor.

An explanation will be omitted of elements having the same number as in FIG. 1.

The stator of this motor M2 comprises a stator base 6 onto which a bearing holder 7 is fixed by caulking or the like and a flexible base 12 is provided on the upper surface of the stator base 6. On top of the flexible base 12 a set number of air-core armature coils are disposed concentrically, centering on the rotary shaft.

Attached inside of the bearing holder 7 are a thrust-receiving part 13, a slip-off prevention washer 11 and a bearing 8. Attached at the upper end thereof is an oil-leak prevention plate 20. A rotor case 70 is attached to the rotary shaft 1.

The rotor case 70, as with the rotor case 30, is made from a magnetic plate material and is formed by press molding. A burring part 74 is formed in the center thereof. The rotor case 70 is fixed to the rotary shaft 1 by press insertion.

A flat plate portion 75 is formed around the burring part 74 on the rotor case 70, and the outer periphery of the rotor case 70 is formed to comprise three consecutive circular shapes formed by press processing, namely, a descending portion 71, a step portion 72 and an outer periphery portion 73. The outer periphery portion 73 is formed as a flat plate, so as to accommodate attachment of a magnet 64.

The descending portion 71 is inclined so as to extend outward as it descends, and the step portion 72 extends farther out than the descending portion 71, thus forming a step. This configuration is the same as in FIG. 1.

Because these portions are formed from a single sheet of material by press processing, as with the rotor case 30, they can be manufactured relatively inexpensively.

An attraction magnet is attached to the bearing part 74.

In the axial air-gap brushless motor M2 thus configured, a lubricating oil absorption member A is attached in the space formed between magnet 64 side end part 61 (on the rotary shaft 1 side) and the step portion 72. The positional relationship between the step portion 72 and the lubricating oil absorbing member A is the same as is shown in FIG. 1.

With such a configuration, a lubricating oil absorption member can also be used in an axial air-gap brushless motor.

In the embodiments shown in FIGS. 1 and 2, descending portions 31 and 71 are respectively provided. However, these descending portions may be omitted, so that the flat surfaces 35, 75 connect directly with the step portions 32, 72.

In such a case, the flat surfaces 35, 75 and the end parts 41, 61 of the magnets 4, 64 form the space for attachment of an oil absorption member.

What is claimed is:

1. In a brushless motor, the combination comprising a rotor having a rotor case, an annular magnet attached to such rotor case, said magnet having an end part, a lubricant absorption member disposed on said end part of the magnet, said rotor case having an intermediate part and a space is provided between said intermediate part and said end part of said magnet, said absorption member having one part disposed in said space and another part extending from said space, said absorption member having the property of being compressed from an uncompressed state to a compressed state, said one part of sid absorption member disposed in said space being in said compressed state, said other part of said absorption member extending from said space being in said uncompressed state.

2. In a brushless motor according to claim 1, wherein said lubricant absorption member is an annular member and is compressed between the rotor case and the end part of the magnet.

3. In a brushless motor according to claim 1, wherein said absorption member is attached to said end portion of said magnet.

4. A brushless motor comprising, a stator, a rotor having a rotor case, a rotor shaft, a magnet disposed on said rotor case such as to provide a space between one part of said magnet and another part of said rotor case, a lubricant absorption member disposed in said space, said rotor casing having a deflecting part which deflects lubricant within said rotor casing toward said absorption member.

5. A brushless motor according to claim 4, wherein said shaft has an axis, said deflecting part being non-parallel to said axis.

* * * * *